(12) United States Patent
Ball

(10) Patent No.: US 7,187,140 B2
(45) Date of Patent: Mar. 6, 2007

(54) LAMP CURRENT CONTROL USING PROFILE SYNTHESIZER

(75) Inventor: Newton E. Ball, Anaheim, CA (US)

(73) Assignee: Microsemi Corporation, Irvine, CA (US)

( * ) Notice: Subject to any disclaimer, the term of this patent is extended or adjusted under 35 U.S.C. 154(b) by 238 days.

(21) Appl. No.: 11/011,753

(22) Filed: Dec. 14, 2004

(65) Prior Publication Data
US 2005/0156539 A1    Jul. 21, 2005

Related U.S. Application Data

(60) Provisional application No. 60/530,025, filed on Dec. 16, 2003.

(51) Int. Cl.
G05F 1/00    (2006.01)

(52) U.S. Cl. ............ 315/291; 315/360; 315/307; 315/224; 315/DIG. 4

(58) Field of Classification Search ........ 315/291, 315/294, 224, 219, 307, 308, 360, 362, 312, 315/DIG. 4
See application file for complete search history.

(56) References Cited

U.S. PATENT DOCUMENTS

| | | | |
|---|---|---|---|
| 2,429,162 A | 10/1947 | Russell et al. |
| 2,440,984 A | 5/1948 | Summers |
| 2,572,258 A | 10/1951 | Goldfield et al. |
| 2,965,799 A | 12/1960 | Brooks et al. |
| 2,968,028 A | 1/1961 | Eilichi et al. |
| 3,141,112 A | 7/1964 | Eppert |
| 3,597,656 A | 8/1971 | Douglas |
| 3,611,021 A | 10/1971 | Wallace |
| 3,737,755 A | 6/1973 | Calkin et al. |
| 3,742,330 A | 6/1973 | Hodges et al. |
| 3,936,696 A | 2/1976 | Gray |
| 3,944,888 A | 3/1976 | Clark |
| 4,060,751 A | 11/1977 | Anderson |
| 4,388,562 A | 6/1983 | Josephson |
| 4,463,287 A | 7/1984 | Pitel |
| 4,523,130 A | 6/1985 | Pitel |
| 4,572,992 A | 2/1986 | Masaki |
| 4,574,222 A | 3/1986 | Anderson |

(Continued)

FOREIGN PATENT DOCUMENTS

EP    0647021 A1    9/1994

(Continued)

OTHER PUBLICATIONS

PCT International Search Report and Written Opinion mailed Aug. 24, 2005, Appl. No. PCT/US04/41912, 10 pages.

*Primary Examiner*—Haissa Philogene
(74) *Attorney, Agent, or Firm*—Knobbe, Martens, Olson & Bear LLP

(57) ABSTRACT

An efficient and flexible current-mode driver delivers power to one or more light sources in a backlight system. In one application, the current-mode driver is configured as an inverter with an input current regulator, a non-resonant polarity-switching network, and a closely-coupled output transformer. The input current regulator can output a regulated current source in a variety of programmable wave shapes. The current-mode driver may further include a rectifier circuit and a second polarity-switching network between the closely-coupled output transformer and a lamp load. In another application, the current-mode driver delivers power to a plurality of light sources in substantially one polarity by providing a regulated current to a network of time-sharing semiconductor switches coupled in series with different light sources coupled across each semiconductor switch.

20 Claims, 10 Drawing Sheets

U.S. PATENT DOCUMENTS

| | | | |
|---|---|---|---|
| 4,622,496 A | 11/1986 | Dattilo et al. | |
| 4,630,005 A | 12/1986 | Clegg et al. | |
| 4,663,566 A | 5/1987 | Nagano | |
| 4,663,570 A | 5/1987 | Luchaco et al. | |
| 4,672,300 A | 6/1987 | Harper | |
| 4,675,574 A | 6/1987 | Delflache | |
| 4,686,615 A | 8/1987 | Ferguson | |
| 4,698,554 A | 10/1987 | Stupp | |
| 4,761,722 A | 8/1988 | Pruitt | |
| 4,766,353 A | 8/1988 | Burgess | |
| 4,780,696 A | 10/1988 | Jirka | |
| 4,847,745 A | 7/1989 | Shekhawat | |
| 4,862,059 A | 8/1989 | Tominaga et al. | |
| 4,939,381 A | 7/1990 | Shibata | |
| 5,023,519 A | 6/1991 | Jensen | |
| 5,030,887 A | 7/1991 | Guisinger | |
| 5,036,255 A | 7/1991 | McKnight et al. | |
| 5,057,808 A | 10/1991 | Dhyanchand | |
| 5,173,643 A | 12/1992 | Sullivan et al. | |
| 5,349,272 A | 9/1994 | Rector | |
| 5,434,477 A | 7/1995 | Crouse et al. | |
| 5,475,284 A | 12/1995 | Lester et al. | |
| 5,485,057 A | 1/1996 | Smallwood et al. | |
| 5,519,289 A | 5/1996 | Katyl et al. | |
| 5,539,281 A | 7/1996 | Shackle et al. | |
| 5,557,249 A | 9/1996 | Reynal | |
| 5,563,473 A | 10/1996 | Mattas et al. | |
| 5,574,335 A | 11/1996 | Sun | |
| 5,574,356 A * | 11/1996 | Parker | 323/207 |
| 5,615,093 A | 3/1997 | Nalbant | |
| 5,619,402 A | 4/1997 | Liu | |
| 5,621,281 A | 4/1997 | Kawabata et al. | |
| 5,652,479 A | 7/1997 | LoCascio et al. | |
| 5,712,776 A | 1/1998 | Palara et al. | |
| 5,719,474 A * | 2/1998 | Vitello | 315/307 |
| 5,754,012 A | 5/1998 | LoCascio | |
| 5,818,172 A | 10/1998 | Lee | |
| 5,822,201 A | 10/1998 | Kijima | |
| 5,825,133 A | 10/1998 | Conway | |
| 5,828,156 A | 10/1998 | Roberts | |
| 5,882,201 A | 3/1999 | Salem | |
| 5,892,336 A | 4/1999 | Lin et al. | |
| 5,910,713 A | 6/1999 | Nishi et al. | |
| 5,912,812 A | 6/1999 | Moriarty, Jr. | |
| 5,914,842 A | 6/1999 | Sievers | |
| 5,923,129 A | 7/1999 | Henry | |
| 5,930,121 A | 7/1999 | Henry | |
| 5,936,360 A | 8/1999 | Kaneko | |
| 6,002,210 A | 12/1999 | Nilssen | |
| 6,020,688 A | 2/2000 | Moisin | |
| 6,028,400 A | 2/2000 | Pol | |
| 6,037,720 A | 3/2000 | Wong et al. | |
| 6,038,149 A | 3/2000 | Hiraoka et al. | |
| 6,040,662 A | 3/2000 | Asayama | |
| 6,043,609 A | 3/2000 | George et al. | |
| 6,049,177 A | 4/2000 | Felper | |
| 6,072,282 A | 6/2000 | Adamson | |
| 6,104,146 A | 8/2000 | Chou et al. | |
| 6,108,215 A | 8/2000 | Kates et al. | |
| 6,114,814 A | 9/2000 | Shannon et al. | |
| 6,121,733 A | 9/2000 | Nilssen | |
| 6,127,785 A | 10/2000 | Williams | |
| 6,127,786 A | 10/2000 | Moisin | |
| 6,137,240 A | 10/2000 | Bogdan | |
| 6,150,772 A | 11/2000 | Crane | |
| 6,169,375 B1 | 1/2001 | Moisin | |
| 6,181,066 B1 | 1/2001 | Adamson | |
| 6,181,083 B1 | 1/2001 | Moisin | |
| 6,181,084 B1 | 1/2001 | Lau | |
| 6,181,553 B1 | 1/2001 | Cipolla et al. | |
| 6,198,234 B1 | 3/2001 | Henry | |
| 6,198,236 B1 | 3/2001 | O'Neill | |
| 6,198,238 B1 | 3/2001 | O'Neill | |
| 6,215,256 B1 | 4/2001 | Ju | |
| 6,218,788 B1 | 4/2001 | Chen et al. | |
| 6,259,615 B1 | 7/2001 | Lin | |
| 6,281,636 B1 | 8/2001 | Okutsu et al. | |
| 6,281,638 B1 | 8/2001 | Moisin | |
| 6,307,765 B1 | 10/2001 | Choi | |
| 6,310,444 B1 | 10/2001 | Chang | |
| 6,316,881 B1 | 11/2001 | Shannon et al. | |
| 6,320,329 B1 | 11/2001 | Wacyk | |
| 6,323,602 B1 | 11/2001 | De Groot et al. | |
| 6,344,699 B1 | 2/2002 | Rimmer | |
| 6,362,577 B1 | 3/2002 | Ito et al. | |
| 6,396,722 B2 | 5/2002 | Lin | |
| 6,417,631 B1 | 7/2002 | Chen et al. | |
| 6,420,839 B1 | 7/2002 | Chiang et al. | |
| 6,433,492 B1 | 8/2002 | Buonavita | |
| 6,445,141 B1 | 9/2002 | Kastner et al. | |
| 6,459,215 B1 | 10/2002 | Nerone et al. | |
| 6,459,216 B1 | 10/2002 | Tsai | |
| 6,469,922 B2 | 10/2002 | Choi | |
| 6,472,827 B1 | 10/2002 | Nilssen | |
| 6,472,876 B1 | 10/2002 | Notohamiprodjo | |
| 6,486,618 B1 | 11/2002 | Li | |
| 6,494,587 B1 | 12/2002 | Shaw et al. | |
| 6,501,234 B2 | 12/2002 | Lin et al. | |
| 6,509,696 B2 | 1/2003 | Bruning et al. | |
| 6,515,427 B2 | 2/2003 | Oura et al. | |
| 6,515,881 B2 | 2/2003 | Chou et al. | |
| 6,531,831 B2 | 3/2003 | Chou et al. | |
| 6,534,934 B1 | 3/2003 | Lin et al. | |
| 6,559,606 B1 | 5/2003 | Chou et al. | |
| 6,570,344 B2 | 5/2003 | Lin | |
| 6,628,093 B2 | 9/2003 | Stevens | |
| 6,633,138 B2 | 10/2003 | Shannon et al. | |
| 6,717,371 B2 | 4/2004 | Lin et al. | |
| 6,717,372 B2 | 4/2004 | Lin | |
| 6,765,354 B2 | 7/2004 | Klein | |
| 6,781,325 B2 | 8/2004 | Lee | |
| 6,784,627 B2 * | 8/2004 | Suzuki et al. | 315/291 |
| 6,804,129 B2 | 10/2004 | Lin | |
| 6,870,330 B2 | 3/2005 | Choi | |
| 6,900,599 B2 * | 5/2005 | Ribarich | 315/247 |
| 6,922,023 B2 | 7/2005 | Hsu et al. | |
| 6,936,975 B2 | 8/2005 | Lin et al. | |
| 2001/0036096 A1 | 11/2001 | Lin | |
| 2002/0030451 A1 | 3/2002 | Moisin | |
| 2002/0097004 A1 | 7/2002 | Chiang et al. | |
| 2002/0135319 A1 | 9/2002 | Bruning et al. | |
| 2002/0140538 A1 | 10/2002 | Yer | |
| 2002/0145886 A1 | 10/2002 | Stevens | |
| 2002/0171376 A1 | 11/2002 | Rust et al. | |
| 2002/0180380 A1 | 12/2002 | Lin | |
| 2002/0180572 A1 | 12/2002 | Kakehashi et al. | |
| 2002/0181260 A1 | 12/2002 | Chou et al. | |
| 2002/0195971 A1 | 12/2002 | Quian et al. | |
| 2003/0001524 A1 | 1/2003 | Lin et al. | |
| 2003/0080695 A1 | 5/2003 | Ohsawa | |
| 2003/0090913 A1 | 5/2003 | Che-Chen et al. | |
| 2003/0117084 A1 | 6/2003 | Stack | |
| 2003/0141829 A1 | 7/2003 | Yu | |
| 2004/0032223 A1 | 2/2004 | Henry | |
| 2004/0155596 A1 | 8/2004 | Ushijima | |
| 2004/0257003 A1 | 12/2004 | Hsieh et al. | |
| 2004/0263092 A1 | 12/2004 | Liu | |
| 2005/0093471 A1 | 5/2005 | Jin | |
| 2005/0093472 A1 | 5/2005 | Jin | |
| 2005/0093482 A1 | 5/2005 | Ball | |
| 2005/0093483 A1 | 5/2005 | Ball | |
| 2005/0093484 A1 | 5/2005 | Ball | |
| 2005/0094372 A1 | 5/2005 | Jin | |
| 2005/0099143 A1 | 5/2005 | Kohno | |

| | | | | | | |
|---|---|---|---|---|---|---|
| 2005/0156536 A1* | 7/2005 | Ball | 315/291 | JP | 8-204488 | 8/1996 |
| 2005/0156540 A1* | 7/2005 | Ball | 315/307 | TW | 554643 | 9/2003 |
| 2005/0162098 A1* | 7/2005 | Ball | 315/291 | TW | 200524481 | 12/2003 |
| 2005/0225261 A1 | 10/2005 | Jin | | TW | 200501829 | 1/2005 |
| 2006/0022612 A1 | 2/2006 | Henry | | WO | WO 94/15444 | 7/1994 |

FOREIGN PATENT DOCUMENTS

JP      06168791 A    6/1994

* cited by examiner

LAMP CURRENT CONTROL USING PROFILE SYNTHESIZER

CLAIM FOR PRIORITY

This application claims the benefit of priority under 35 U.S.C. § 119(e) of U.S. Provisional Application No. 60/530,025, filed on Dec. 16, 2003 and entitled "Current-Mode Driver for CCFL," the entirety of which is incorporated herein by reference.

RELATED APPLICATIONS

Applicant's copending U.S. Patent Applications entitled "Inverter with Two Switching Stages for Driving Lamp," "Current-Mode Direct-Drive Inverter," and "Method and Apparatus to Drive LED Arrays Using Time Sharing Technique," filed on the same day as this application, are hereby incorporated by reference herein.

BACKGROUND OF THE INVENTION

1. Field of the Invention

The present invention relates to a current-mode driver for powering different light sources in a backlight system.

2. Description of the Related Art

Inverter controllers for driving lamps typically regulate the voltage across each lamp and any series-connected ballast capacitor or inductor. The voltage regulation technique makes striking the lamp and regulating the lamp current difficult to achieve without costly and complex circuitry. For example, a lamp driver typically includes a starting algorithm that is different from steady state operations to light the lamp. The starting algorithm usually runs at a higher frequency and uses strike detection circuits that complicate the lamp driver design. Furthermore, gas discharge lamps have a negative resistance characteristic, and the lamp driver typically needs some degree of resonance to achieve sufficient high impedance for smooth operation after striking the lamp. Tuning the lamp with shunt capacitance across primary or secondary windings of an output transformer in the lamp driver is common.

SUMMARY OF THE INVENTION

The present invention proposes an efficient and flexible current-mode driver for delivering power to one or more light sources in a backlight system. Backlight is needed to illuminate a screen to make a visible display in liquid crystal display (LCD) applications, such as a LCD television, a desk top monitor, an automotive display, a notebook computer, a tablet computer, etc. In one embodiment, fluorescent lamps are used as the light sources in the backlight system, and a current-mode inverter generates a regulated current to drive the fluorescent lamps. The regulated current helps to generate a stable light output and to maintain a long operating life for the fluorescent lamps.

The current-mode inverter advantageously operates in a single continuous operating mode for both striking and regulating power to a lamp, such as a cold cathode fluorescent lamp (CCFL). In other words, no dedicated circuits or algorithms are needed to strike the lamp. The single continuous mode of operation simplifies the number of functions supported by a current-mode controller in the current-mode inverter. In one embodiment, the current-mode controller has less than half as many functions as a voltage-mode controller and can be implemented using approximately half as much chip area. In addition, the current-mode inverter has direct control over the lamp current, thus eliminating the need for tuning or other accommodations to account for different lamps or aging of lamps.

In one embodiment, the current-mode inverter includes a current regulator, a non-resonant (or direct-drive) switching network, and a closely-coupled output transformer. The current regulator accepts a direct current (DC) voltage and outputs a regulated current. The non-resonant switching network is directly coupled to the closely-coupled output transformer and produces an alternating current (AC) driving current by periodically alternating conduction paths for the regulated current. The closely-coupled output transformer conducts the AC driving current in a primary winding and a corresponding load current in a secondary winding. The load current has a substantially identical wave shape as the AC driving current with a proportional amplitude. Thus, the current-mode inverter has direct control over the load current.

In one embodiment, a current-mode inverter (e.g., a multi-stage switching inverter) has two switching stages to drive a lamp load in a backlight system. The multi-stage switching inverter includes a first switching stage, a rectifier circuit and a second switching stage. The first switching stage operates at relatively high frequency to periodically couple an input current (e.g., a DC current) through a primary winding of a transformer in alternating sense to generate a primary AC driving current. The secondary winding of the transformer conducts a proportional secondary AC driving current with a relatively high AC voltage. The rectifier circuit is coupled across the secondary winding to generate a relatively high voltage and substantially DC current source. The second switching stage is coupled between the rectifier circuit and a lamp load. The second switching stage includes semiconductor switches directly coupled to the lamp load and operates at relatively low frequency to generate an AC lamp current through the lamp load. In one embodiment, the AC lamp current has a substantially square wave shape.

The relatively high frequency operation of the first switching stage (or power switching stage) advantageously reduces size of components (e.g., the transformer). In one embodiment, the first switching stage operates in a frequency range of 100 kilohertz to 4 Megahertz. In one application, the first switching stage operates at approximately 2 Megahertz. The relatively low frequency operation of the second switching stage (or polarity switching stage) advantageously improves efficiency (e.g., by reducing switching loss or by reducing crest factor in load current). In one embodiment, the second switching stage operates in a frequency range of 100 hertz to 4 kilohertz. In one application, the second switching stage operates at approximately 400 hertz.

In one embodiment, a controller for a current-mode inverter outputs a current profile signal to an input current regulator. The input current regulator uses the current profile signal to produce a regulated current with a substantially identical wave shape and proportional amplitude. The current profile signal can be programmed for a variety of wave shapes (e.g., sine wave, square wave, trapezoidal wave, triangular wave) and amplitudes to optimize efficiency or to reduce electromagnetic interference (EMI) for specific applications. In one embodiment, the controller includes a clock generator, a current profile generator, and a register state machine to generate the current profile signal. The clock generator outputs a periodic timing (e.g., triangular)

waveform, and the register state machine controls the operation of the current profile generator with reference to the periodic timing waveform.

In one embodiment, the current profile generator uses at least two input control signals (e.g., BRITE-W, BRITE-H) and a slope capacitor to determine the wave shape and amplitude of the current profile signal. The amplitude of the current profile signal is periodically set to zero during a zero (or reset) state near the beginning of each cycle of a triangular timing waveform. When the voltage of the triangular timing waveform exceeds the voltage of the first input control signal (e.g., BRITE-W), the current profile signal begins a rising state with its amplitude increasing at a predetermined rising rate. The slope capacitor charges during the rising state. When the voltage across the charging slope capacitor exceeds the voltage of the second input control signal (e.g., BRITE-H), the slope capacitor stops charging. The current profile signal also stops rising in amplitude and begins a plateau state by holding its amplitude at a substantially constant level. The voltage of the triangular timing waveform is noted at or near the beginning of the plateau state. The plateau state ends and the current profile signal begins a falling state in which its amplitude starts fall at a predetermined falling rate at or near the time that the voltage of the triangular timing waveform becomes less than the noted voltage at the beginning of the plateau state. The slope capacitor discharges during the falling state. The slope capacitor finishes discharging and the amplitude of the current profile signal returns to zero at approximately the time that the voltage of the triangular timing waveform becomes less than the first input control signal.

The current profile generator advantageously allows for selectable rise and fall slopes for the current profile signal. For example, the rise and fall slopes are determined by the two input control signals (BRITE-W, BRITE-H), the slope capacitor and an optional slope resistor. In one embodiment, the rise and fall times are programmed to be less than one microsecond for a current profile signal with a square wave shape. In another embodiment, the rise and fall times exceed one microsecond for a current profile signal with a trapezoidal wave shape. In yet another embodiment, the current profile signal has a special trapezoidal wave shape that substantially follows the wave shape of the triangular timing waveform with its amplitude clipped at ⅔ of the peak amplitude of the triangular timing waveform. The special trapezoidal waveform can be subsequently filtered by small reactive components to produce a sine wave with reduced harmonics (e.g., substantially no harmonics less than the $5^{th}$ harmonic).

In one embodiment, a current-mode driver delivers power to a plurality of light sources in a backlight system by providing a regulated current to a network of semiconductor switches coupled in series and the light sources coupled across the respective semiconductor switches. Each of the semiconductor switches individually closes to isolate its associated light source from the regulated current or selectively opens to allow the associated load to conduct the regulated current. In one embodiment, the network of semiconductor switches uses a time sharing technique to selectively provide the regulated current to different portions of an array of light emitting diodes (LEDs) used to backlight a LCD. For example, a string of series-connected LEDs corresponding to a row in the array is coupled across each semiconductor switch. The semiconductor switches periodically close in sequential order to minimize backlight in portions of the LCD that is currently updating its image. The time sharing technique advantageously allows a single current source to power banks (or arrays) of series-coupled light sources.

It should be noted that the applications of the current-mode drivers described above are not limited to lamps or LEDs. The current-mode drivers can also be applied to other types of loads in which current-mode operation or direct control of load current is desired.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE EMBODIMENTS

Figure 1:
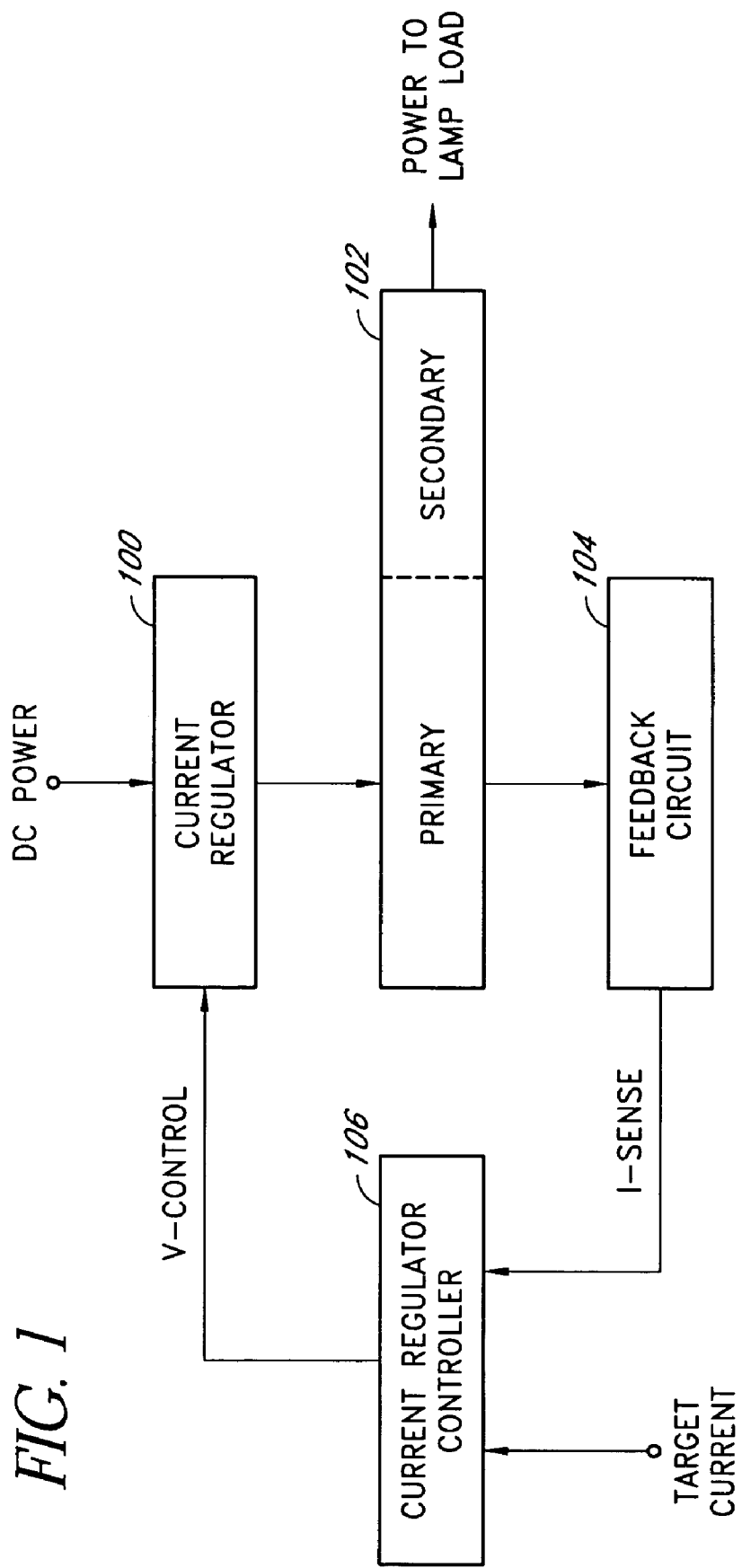
FIG. 1 is a simplified block diagram of one embodiment of a current-mode inverter.

Embodiments of the present invention will be described hereinafter with reference to the drawings. FIG. 1 is a simplified block diagram of one embodiment of a current-mode inverter. The current-mode inverter includes an input current regulator 100, a polarity-switching and transformer network (or polarity reversing stage) 102, a feedback circuit 104, and a current regulator controller 106. The input current regulator 100 accepts a DC power source (e.g., a regulated or unregulated DC voltage) and generates a regulated current for the polarity-switching and transformer network 102. The polarity-switching and transformer network 102 includes semiconductor switches, such as metal-oxide-semiconductor field-effect-transistors (MOSFETs), directly coupled to a primary winding of a closely-coupled transformer. The semiconductor switches are controlled by a controller (e.g., a pulse width modulator) to periodically couple the regulated current through the primary winding in alternate sense, thereby generating a primary AC current through the primary winding. A corresponding secondary AC current is generated in a secondary winding of the closely-coupled transformer. The secondary AC current is substantially the current conducted by a lamp load coupled to the secondary winding.

In one embodiment, the feedback circuit 104 is coupled to a primary side of the polarity-switching and transformer network 102 to sense the primary AC current. The feedback circuit generates a feedback signal (e.g., a feedback voltage) indicative of the level of the primary AC current. In one embodiment, the feedback signal (I-SENSE) is provided to the current regulator controller 106 for comparison with a brightness control signal (e.g., a voltage representative of a desired lamp current) and outputs a current control signal (V-CONTROL) to the input current regulator 100. The brightness control signal may also be referred to as the current reference or target current signal. The target current signal can be substantially constant or a periodic waveform generated by a current profile generator which is discussed in further details below.

The input current regulator 100 controls the level and shape of the regulated current based on the target current signal. The current conducted by the lamp load is directly proportional to the regulated current with its polarity periodically reversed. Thus, the target current signal controls the current conducted by the lamp load and its corresponding brightness. For example, the current delivered to the primary winding of the closely-coupled transformer is regulated to substantially follow the wave shape of the target current signal, using the closed loop feedback technique described above. The input current regulator 100 can operate as a hysteretic pulse width modulation (PWM) switching regulator, a clocked PWM switching regulator, or a linear current regulator.

Because the closely-coupled transformer is a current transformer as well as a voltage transformer, the secondary AC current (or lamp current) conducted by the secondary winding of the closely-coupled transformer is related to the primary AC current (or regulated AC current) through the primary winding by the reciprocal of the transformer turns ratio. The closely-coupled transformer has a relatively higher ratio of magnetization inductance to leakage inductance (e.g., 300:1) in comparison to ratios (e.g., 10:1) for a loosely-coupled transformer typically used in resonant drivers. In one embodiment, the ratio of the magnetization inductance (or open inductance) to leakage inductance (or shorted inductance) is greater than 30:1 (e.g., 3000:1). Current conducted by the secondary winding of the closely-coupled transformer advantageously has substantially the same wave shape as current conducted by the primary winding with a proportional amplitude determined by the transformer turns ratio.

Thus, the lamp current can be directly controlled by coupling the feedback circuit 104 to the primary side of the polarity-switching and transformer network 102 and sensing the current conducted by the primary winding of the closely-coupled transformer. The proposed primary-side monitoring advantageously eliminates the need for a common ground reference between the primary and secondary sides of the closely-coupled transformer for accurate sensing of the load current. That is, lamps coupled to the secondary side of the closely-coupled transformer can advantageously operate in floating configurations. Alternately, any single point in the secondary side or among the lamps may be connected to ground without affecting the current-mode inverter functions. However, a ground connection may affect stray currents.

The current-mode inverter directly controls lamp ignition by direct regulation of the lamp current. The current-mode inverter reliably ignites a lamp of any size or formulation over a wide temperature range and aging. The secondary winding of the closely-coupled transformer operates to automatically produce a sufficient voltage across the lamp to conduct the desired lamp current. The output impedance of the current-mode inverter is sufficiently high for stable operations under most conditions. The transition from lamp striking to normal operation is smooth with no changes in control techniques.

The current-mode inverter accurately regulates the lamp current against supply voltage variations, wide temperature ranges and lamp aging. In one embodiment, the current-mode inverter tolerates 5:1 variations in the load impedance and provides input line voltage compliance over more than a 2:1 range. Thus, the current-mode inverter can be adapted to drive many differently sized backlight units.

Figure 2A:
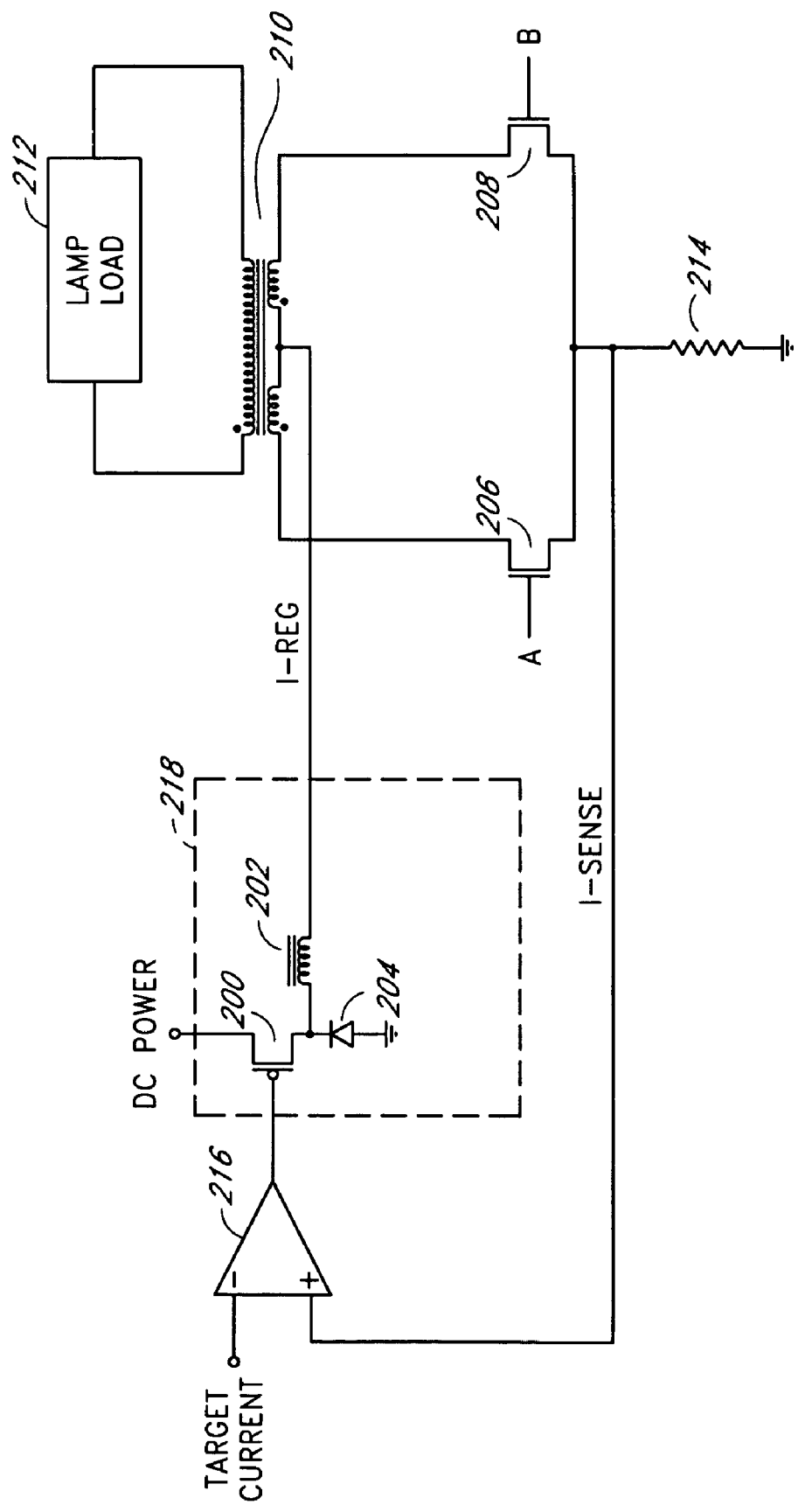
FIG. 2A is a simplified schematic of one embodiment of a current-mode inverter with a push-pull polarity-switching stage.

FIG. 2A is a simplified schematic of one embodiment of a current-mode inverter with a push-pull polarity-switching stage. The current-mode inverter includes a switching current regulator 218, a push-pull polarity-switching network, and a closely-coupled (or tightly-coupled) transformer 210. In one embodiment, the switching current regulator 218 includes a current switch (e.g., a P-FET) 200, a series inductor 202 and a catch diode 204. The current switch 200 is coupled between an input supply (DC POWER) and a first terminal of the series inductor 202. The catch diode 204 is coupled between the first terminal of the series inductor 202 and a ground return. A second terminal of the series inductor 202 outputs a regulated current (I-REG).

In one embodiment, the push-pull polarity-switching network includes two semiconductor switches (e.g., N-FETs) 206, 208 with drain terminals coupled to respective opposite terminals of a primary winding of the closely-coupled transformer 210. Source terminals of the semiconductor switches 206, 208 are commonly connected and coupled to ground via a sensing resistor 214. The regulated current at the second terminal of the series inductor 202 is applied to a center tap of the closely-coupled transformer 210.

A controller (not shown) outputs driving signals (A, B) to control the semiconductor switches 206, 208 in generating a primary AC current in the primary winding of the closely-coupled transformer 210. For example, the semiconductor switches 206, 208 alternately conduct to reverse the direction (or polarity) of the regulated current through the primary winding to generate the primary AC current. A corresponding secondary AC current flows through a secondary winding of the closely-coupled transformer 210 and delivers power to a lamp load 212 coupled across the secondary winding. The secondary AC current has a substantially identical wave shape as the primary AC current and proportional amplitude.

The on states of the semiconductor switches 206, 208 overlap to continuously provide at least one current path for the regulated current. In one embodiment, both semiconductor switches 206, 208 remain on to stop generating the primary AC current, thereby disconnecting power to the lamp load 212 coupled across the secondary winding of the closely-coupled transformer 210. For example, power is not provided to the lamp load 212 in the event of a shorted lamp, a missing lamp or other fault conditions.

Figure 2B:
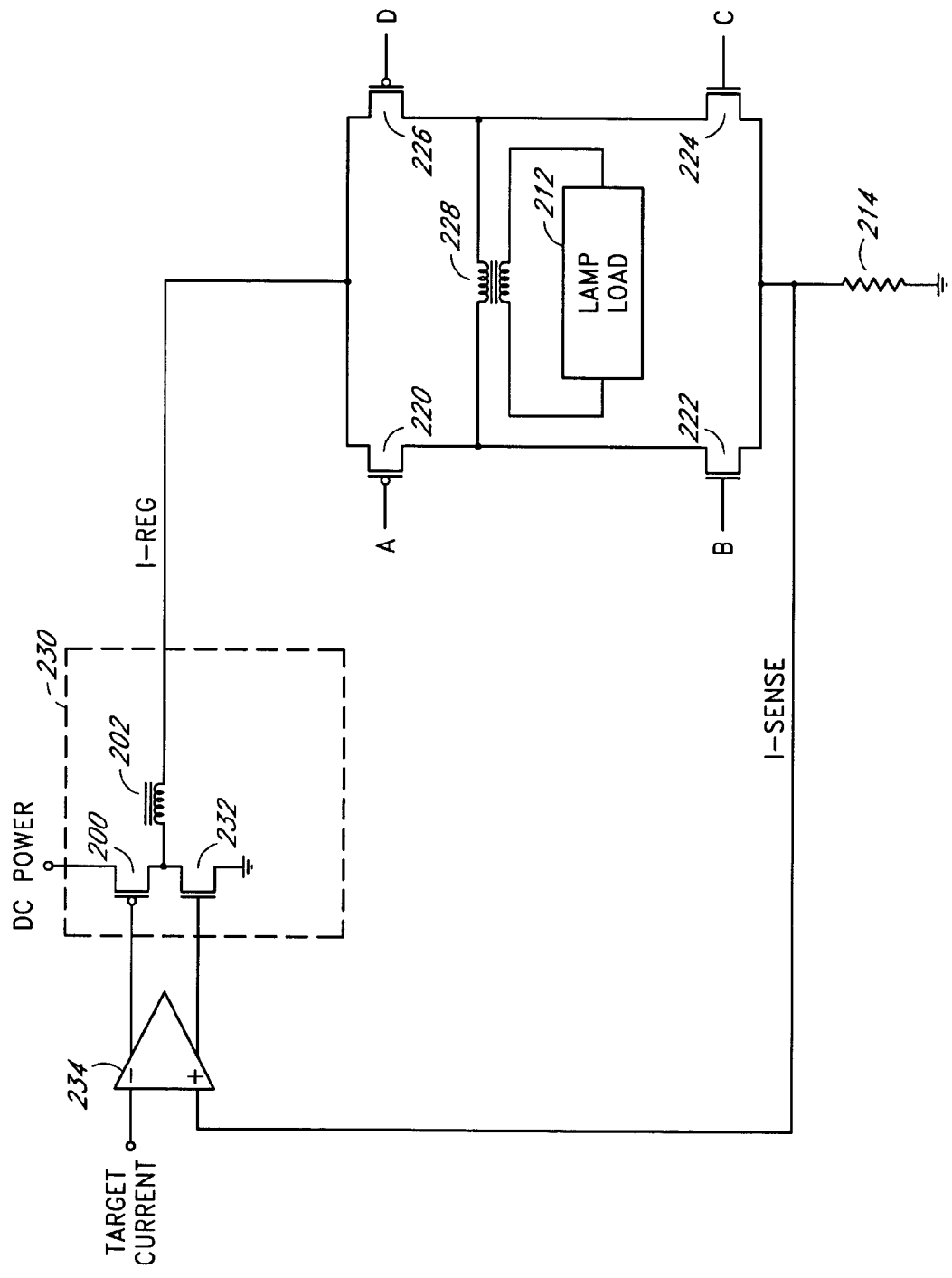
FIG. 2B is a simplified schematic of another embodiment of a current-mode inverter with a full-bridge polarity-switching stage.

Other polarity-switching topologies may also be used to generate the primary AC current. For example, a full-bridge topology is shown in FIG. 2B. The disclosed polarity-switching topologies advantageously do not include reactance components for non-resonant operation. Semiconductor switches are directly coupled to closely-coupled transformers.

The series inductor 202 at the output of the switching current regulator 218 provides a high impedance upstream of the closely-coupled transformer 210 and push-pull polarity-switching network. The high impedance is referred by the closely-coupled transformer 210 as an even higher impedance as seen by the lamp load 212 coupled across the secondary winding of the closely-coupled transformer 210. This changes the nature of lamp ignition from a discontinuous "strike" phenomenon to a smooth event. For example, the voltage across the secondary winding of the closely-coupled transformer 210 automatically increases to ignite the lamp load 212. The current-mode inverter advantageously operates in a single continuous mode (e.g., at fixed frequencies) for striking and regulating power to the lamp load. The voltage across the secondary winding of the closely-coupled transformer 210 automatically produces sufficient voltage for the lamp load 212 to conduct the desired current.

The lamp load 212 can be one lamp or a network (or array) of lamps. The lamp load 212 conducts the secondary AC current (or lamp current) which has substantially the same wave shape as the primary AC current with proportional amplitude. In one embodiment, the sensing (or shunt) resistor 214 monitors the primary AC current, thereby monitoring the lamp current. A feedback voltage (I-SENSE) across the sensing resistor 214 can be used for brightness control of the lamp load 212. For example, the feedback voltage can be used to control duty cycle or burst mode durations in the switching current regulator 218 or in the push-pull polarity switching network. A combination of adjustments may be made to provide a wide dimming range, which is helpful in automotive applications that compensate for wide variations in temperature and ambient light.

In one embodiment, the feedback voltage is provided to a comparator circuit 216. The comparator circuit 216 may attenuate, rectify or filter the feedback voltage before comparison with a target current signal (TARGET CURRENT). The target current signal can be substantially constant with unpredictable variations or can be a periodic waveform. In one embodiment, the switching current regulator 218 operates in a hysteretic mode, and the comparator circuit 216 outputs a control signal to the current switch 200 to adjust the level of the regulated current in accordance with the target current signal. In one embodiment, the regulated current follows the wave shape of the target current signal. The hysteretic mode advantageously does not use a clock and is relatively simple to implement. However, other operating modes, as discussed above, are also possible.

The closely-coupled transformer 210 is a power transformer and is suitable for driving large arrays of large lamps. The closely-coupled characteristic also prevents overshoots in voltages on the semiconductor switches 206, 208. In one embodiment, the semiconductor switches 206, 208 are both on (e.g., closed or conducting) during an idle state. When the semiconductor switches 206, 208 are both on, no net current flows through the primary winding of the closely-coupled transformer 210. The semiconductor switches 206, 208 may conduct an idle current limited by the switching current regulator 218. However, no current is provided to the lamp load 212 in the idle state. The lamp load 212 is advantageously short-safe. That is, shorting the lamp load 212 does not result in excessive current or damage to the current-mode inverter. The switching regulator 218 can provide fault protection in the event of a missing or faulty lamp load by limiting the regulated current.

As discussed above, the lamp load 212 may include more than one lamp (e.g., an array of CCFLs) for backlighting a LCD. The lamp load 212 can be arranged in a variety of configurations, which advantageously allows large array of lamps to run from a single controller and a single power transformer (i.e., the closely-coupled transformer 210) in the current-mode inverter. In one embodiment, multiple lamps are coupled in series across the secondary winding of the closely-coupled transformer 210.

Furthermore, the lamp load 212 may include optional capacitors coupled in series with the lamps or balancing transformers for current balancing groups of lamps. In a first embodiment, the lamp load includes a plurality of balancing (or load) transformers with primary windings coupled in series across the secondary winding of the closely-coupled transformer 210 and secondary windings separately coupled to one lamp or multiple lamps. In a second embodiment, the lamp load 212 includes a plurality of balancing transformers in a ring configuration. Secondary windings of the balancing transformers are coupled in series to form a closed loop in the ring configuration, while primary windings are coupled to different lamps to form parallel primary winding-lamp combinations across the secondary winding of the closely-coupled transformer 210. Further details of this second embodiment of the lamp load 212 are discussed in commonly-owned pending U.S. application Ser. No. 10/958,668, entitled "A Current Sharing Scheme for Multiple CCF Lamp Operation," which is hereby incorporated by reference herein.

In a third embodiment, the lamp load 212 includes balancing transformers (or two-way transformers) to couple multiple lamps in a variety of tree topologies for balancing current among the multiple lamps. For example, the two-way transformers can be arranged in a simple tree structure to split a single output current into multiple substantially equal currents for powering the multiple lamps. The two-way transformers can be coupled on one end of the lamps or split between both ends of the lamps. Further details of this third embodiment of the lamp load 212 are discussed in commonly-owned pending U.S. application Ser. No. 10/970,243, entitled "Systems and Methods for a Transformer Configuration with a Tree Topology for Current Balancing in Gas Discharge Lamps," which is hereby incorporated by reference herein.

FIG. 2B illustrates alternate embodiments for circuits shown in FIG. 2A. The current-mode inverter of FIG. 2B illustrates an alternate embodiment of a switching current regulator 230 which replaces the catch diode 204 with a semiconductor switch 232. An alternate embodiment of a comparator circuit 234 outputs two PWM control signals to respectively drive the current switch 200 and the semiconductor 232. Finally, an alternate embodiment of the polarity-switching stage is illustrated with four semiconductor switches 220, 222, 224, 226 in a full-bridge configuration.

In the embodiment of FIG. 2B, the polarity-switching stage includes the four semiconductor switches 220, 222, 224, 226 directly coupled to a primary winding of a transformer (e.g., a closely-coupled transformer) 228 in a full-bridge configuration for non-resonant operation. The four semiconductor switches 220, 222, 224, 226 are controlled by respective gate control signals (A, B, C, D) coupled to their gate terminals. The gate control signals can be provided by a PWM controller, which is not shown for clarity of illustration.

In the embodiment of FIG. 2B, the top semiconductor switches 220, 226 are p-type FETs (i.e., P-FETs) with respective source terminals commonly connected to an output of the switching current regulator 230. The top semiconductor switches 220, 226 can alternately be n-type FETs (i.e., N-FETs) with respective drain terminals commonly connected to the output of the switching current regulator 230 and with suitable adjustments to the levels of the respective gate control signals (A, D) for driving N-FETs. In the embodiment of FIG. 2B, the bottom semiconductor switches 222, 224 are N-FETs with respective source terminals commonly connected and coupled through the sensing resistor 214 to ground. The drain terminals of semiconductor switches 220, 222 are directly coupled to one terminal of the primary winding of the transformer 228. The drain terminals of the semiconductor switches 224, 226 are directly coupled to an opposite terminal of the primary winding of the transformer 228.

The switching current regulator 230 outputs a regulated current (I-REG), and the semiconductor switches 220, 222, 224, 226 alternately conduct in pairs to couple the regulated current through the primary winding of the transformer 228 in alternate sense to generate a primary AC current. For example, the first pair of semiconductor switches 220, 224 are closed (or on) while the second pair of semiconductor switches 222, 226 are opened (or off) to allow the primary winding to conduct the regulated current in a first direction (or polarity). Then, the first pair of semiconductor switches 220, 224 are opened while the second pair of semiconductor switches 222, 226 are closed to allow the primary winding to conduct the regulated current in a second polarity.

The primary AC current through the primary winding results from periodically alternating the conduction states between the first pair of semiconductor switches 220, 224 and the second pair of semiconductor switches 222, 226. A corresponding secondary AC current flows through a secondary winding of the transformer 228 to power the lamp load 212 coupled across the secondary winding. In one embodiment, the conduction (or on) states between the first pair of semiconductor switches 220, 224 and the second pair of semiconductor switches 224, 226 overlap between alternating states to continuously provided a current path for the regulated current to ground. Both pairs of semiconductor switches 220, 222, 224, 226 remain on in an inactive state to stop the primary winding from conducting current, The inactive state occurs when power to the lamp load 212 is not desired (e.g., to turn off the lamp load or in case of a missing or faulty lamp load).

Figure 3A:
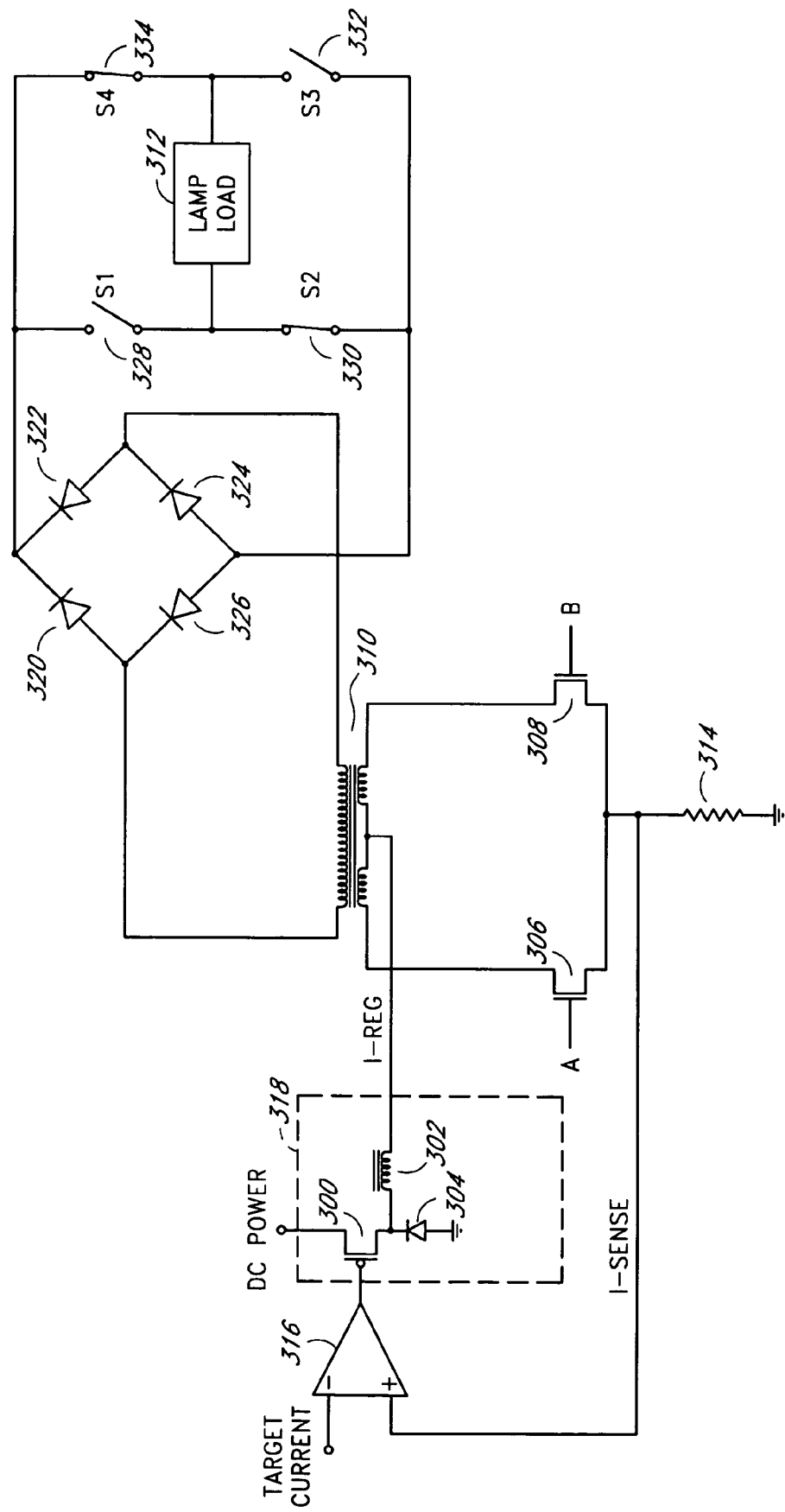
FIG. 3A is a simplified schematic of one embodiment of a current-mode inverter with two switching stages.

FIG. 3A is a simplified schematic of one embodiment of a two-stage current-mode inverter. The simplified schematic of FIG. 3A is substantially similar to the simplified schematic of FIG. 2A with an additional rectifier circuit and a full-bridge high-level switching network. Thus, the two-stage current-mode inverter has two switching stages.

The first switching stage, a push-pull switching network, is coupled on a primary side of a transformer (e.g., a closely-coupled transformer) 310. The first switching stage includes two semiconductor switches (e.g., N-FETs) 306, 308 with respective drain terminals coupled to opposite terminals of a primary winding of the transformer 310. Source terminals of the semiconductor switches 306, 308 are commonly connected and coupled to ground via a sensing resistor 314. The voltage across the sensing resistor 314 is provided as a feedback signal (I-SENSE) to a non-inverting input of a comparator circuit 316. An input control signal (TARGET CURRENT) is provided to an inverting input of the comparator circuit 316. The comparator circuit 316 controls a switching current regulator 318 to generate a regulated current (I-REG). The switching current regulator 318 is substantially similar to the switching current regulator 218 shown in FIG. 2A with a corresponding current switch 300, series inductor 302 and catch diode 304.

In one embodiment, the regulated current is substantially constant during steady state operation with its amplitude determined by the input control signal (TARGET CURRENT). The regulated current is provided to a center tap of the transformer 310. The semiconductor switches 306, 308 alternately conduct to reverse the direction of the regulated current through the primary winding to generate a primary square wave driving current. A secondary winding of the transformer 310 conducts a secondary square wave driving current with a proportional amplitude and a relatively high AC voltage.

The rectifier circuit is coupled across the secondary winding of the transformer 310 to rectify the secondary square wave driving current into a substantially DC current source at relatively high voltage. In the embodiment shown in FIG. 3A, the rectifier circuit is a full-wave bridge rectifier implemented by four diodes 320, 322, 324, 326. The second switching stage (i.e., the full-bridge high-level switching network) is coupled between outputs of the rectifier circuit and a lamp load 312. The second switching stage includes four semiconductor switches (S1, S2, S3, S4) 328, 330, 332, 334 directly coupled to the lamp load 312 for non-resonant operation. The semiconductor switches 328, 330, 332, 334 alternately conduct in pairs (e.g., S1 and S3, S2 and S4) to generate a square wave load current (or lamp current) through the lamp load 312.

The first switching stage advantageously operates at relatively high frequencies to generate a high voltage AC current power across the secondary winding of the transformer 310. High frequency operations (e.g., 2 Megahertz) reduce the size of magnetic components (e.g., the series inductor 302 and the transformer 310). In one embodiment, the first switching stage operates in a frequency range of 100 kilohertz to 4 Megahertz.

The second switching stage advantageously operations at relatively low frequencies (e.g., 250 hertz) to generate the lamp current directly across the lamp load 312. Low frequency operations reduce switching loss, which is proportional to frequency, and stray currents from the lamp load 312 to chassis. In one embodiment, the second switching stage operates in a frequency range of 100 hertz to 4 kilohertz. In one application, the second switching stage operates at approximately 400 hertz.

Furthermore, the low frequency operations of the second switching stage improve luminous efficiency by reducing lamp current crest factor closer to an ideal value of one. The lamp crest factor is defined as a ratio of the peak lamp current level to a root-mean-square (RMS) lamp current level. The lamp crest factor improves when rise and fall times as percentages of the period decrease for the lamp current. The rise and fall times of the lamp current are substantially limited by the transition times of the semiconductor switches 328, 330, 332, 334 and are substantially the same across frequencies. Thus, lower frequency provides a longer period and results in better lamp current crest factor.

In one embodiment, the semiconductor switches 306, 308 in the first switching stage operate with overlapping closures to facilitate stable current-mode operations. The semiconductor switches 328, 330, 332, 334 can also operate with overlapping closures. In one embodiment, the semiconductor switches 306, 308 of the first switching stage are continuously closed during an idle state in which power is not provided to the lamp load 312. The semiconductor switches 328, 330, 332, 334 can also be closed during the idle state.

Figure 3B:
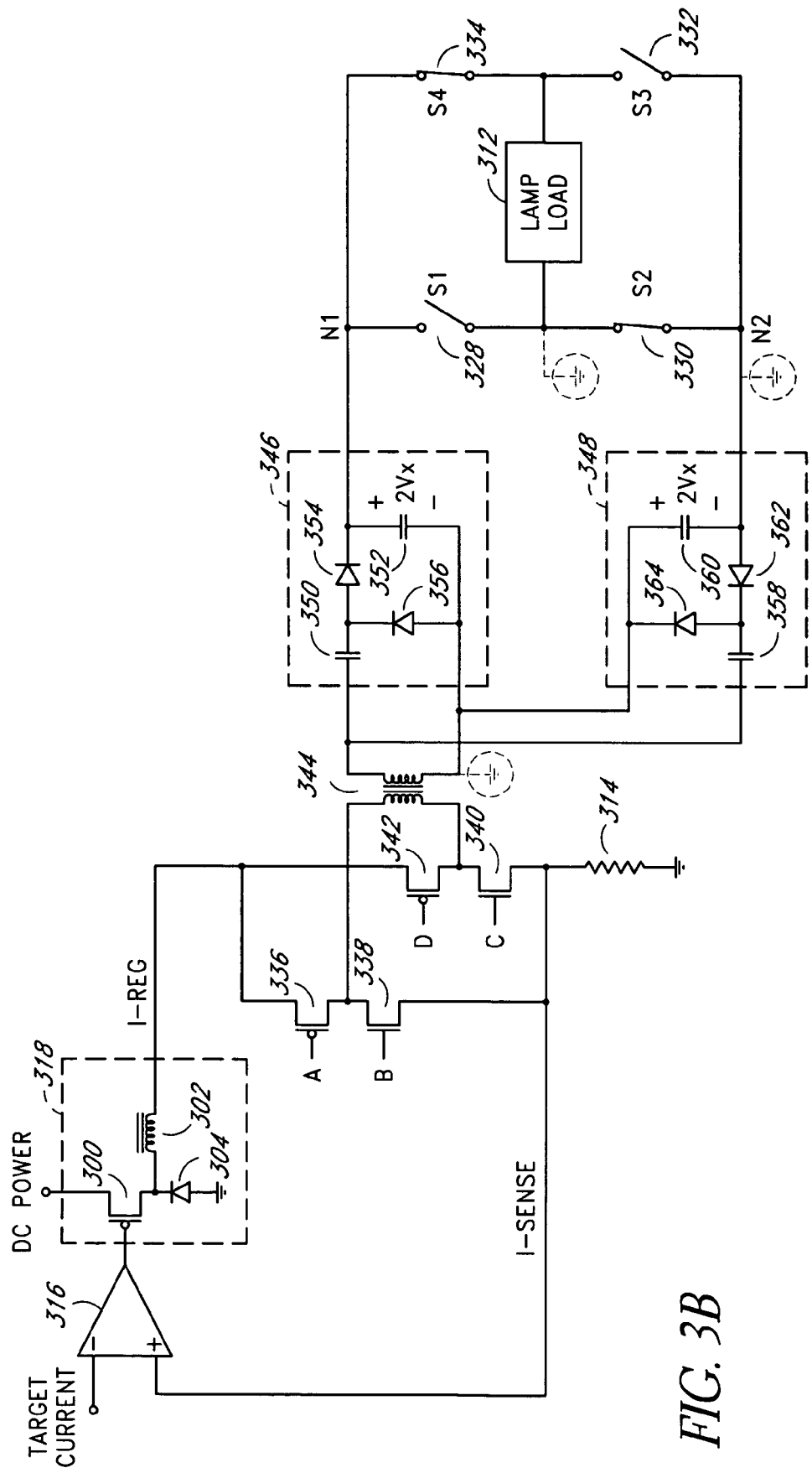
FIG. 3B is a simplified schematic of another embodiment of a current-mode inverter with two switching stages.

FIG. 3B is a simplified schematic of another embodiment of a current-mode inverter with two switching stages. The two-stage current-mode inverter of FIG. 3B is substantially similar to the two-stage current-mode inverter of FIG. 3A with the exceptions that the first switching stage uses a full-bridge topology instead of the push-pull topology and the rectifier circuit includes a pair of half-wave voltage doublers 346, 348 instead of the full-wave bridge rectifier. The following discussion focuses on these differences.

In one embodiment, the first switching stage uses four transistors 336, 338, 340 342 to implement the full-bridge topology. A pair of p-type transistors 336, 342 is coupled between the output of the switching current regulator 318 and respective ends of a primary winding of a transformer 344. A pair of n-type transistors 338, 340 is coupled between the respective ends of the primary winding and a feedback terminal. The feedback terminal is coupled to ground via the sensing resistor 314. The transistors 336, 338, 340 342 alternately conduct to couple the regulated current in alternate sense through the primary winding to generate a primary AC current.

In one embodiment, the regulated current is substantially constant, and the primary AC current has a substantially square wave shape and is associated with relatively low voltage amplitude. A corresponding secondary AC current flows through a secondary winding of the transformer 344. The secondary AC current follows the wave shape of the primary AC current and is associated with relatively high voltage amplitude with a peak voltage of Vx. The two half-wave voltage doublers 346, 348 are coupled across the secondary winding to rectify the secondary AC current into a high voltage DC current source for the second switching stage. The voltage amplitude across the rectifier outputs associated with the high voltage DC current source is approximately four times the peak voltage associated with the secondary AC current.

In one embodiment, each of the half-wave doublers 346, 348 includes two diodes, a charging capacitor, and an output capacitor. For example, the first half-wave doubler (or positive doubler) 346 includes a first charging capacitor 350, a first output capacitor 352, a first diode 354 and a second diode 356. The first charging capacitor 350 is coupled between a first (or high-side) terminal of the secondary winding and an anode of the first diode 354. A cathode of the first diode 354 is coupled to a first (or positive) output of the rectifier circuit. The second diode 356 has an anode coupled to a second (or low-side) terminal of the secondary winding and a cathode coupled to the anode of the first diode 354. The first output capacitor 352 is coupled between the low-side terminal of the secondary winding and the positive output of the rectifier circuit.

During a negative cycle of the secondary AC current, with respect to the high-side terminal of the secondary winding, the first charging capacitor 350 is charged through the second diode 356. During a positive cycle of the secondary AC current, the voltage across the first charging capacitor 350 adds in phase with the voltage across the secondary winding and charges the first output capacitor 352 to a positive potential that is about twice the peak amplitude across the secondary winding (e.g., +2Vx with respect to the low-side terminal of the secondary winding).

The second half-wave doubler (or negative doubler) 348 includes a second charging capacitor 358, a second output capacitor 360, a third diode 362 and a fourth diode 364. The second charging capacitor 358 is coupled between the high-side terminal of the secondary winding and a cathode of the third diode 362. An anode of the third diode 362 is coupled to a second (or negative) output of the rectifier circuit. The fourth diode 364 has a cathode coupled to the low-side terminal of the secondary winding and an anode coupled to the cathode of the third diode 362. The second output capacitor 360 is coupled between the low-side terminal of the secondary winding and the negative output of the rectifier circuit.

The negative doubler 348 works in substantially the same manner as the positive doubler 346 but in opposite phase to produce a negative potential that is twice the peak amplitude across the secondary winding (e.g., −2Vx with respect to the low-side terminal of the secondary winding). The negative potential is provided at the negative output of the rectifier circuit. The outputs of the rectifier circuit (or the half-wave doublers 346, 348) are coupled to the lamp load 312 via the second switching stage. In one embodiment, the output capacitors 352, 360 of the half-wave doublers 346, 348 can be eliminated if there is sufficient capacitance in the lamp load 312.

A ground reference may be optionally connected at various points between the secondary winding of the transformer 344 and the lamp load 312. In one embodiment, the ground reference is connected to the low-side terminal of the secondary winding for balanced rectifier outputs to drive a floating lamp load 312. The balanced rectifier outputs (e.g., +2Vx at the positive output and −2Vx at the negative output) advantageously minimizes the highest potential in the current-mode inverter to be approximately half of the amplitude across the lamp load 312 for safer operations and less corona discharge from the lamps to chassis.

In another embodiment, the ground reference is connected to the negative output of the rectifier circuit for a single-ended connection to the lamp load 312. In yet another embodiment, the ground reference is connected to one terminal of the lamp load 312. Similar ground connections can also be made in the current-mode inverters illustrated in FIGS. 2A, 2B and 3A.

In one embodiment, the switching current regulator 318, the first switching stage and the second switching stage are advantageously controlled by a common controller. The control signals for the first and second switching stages can be phase-locked or can be independently generated with no phase relationship. The common controller can be implemented in an integrated circuit.

The current-mode inverters described above offer wide dimming ranges. Multiple dimming (or brightness control) methods (e.g., current amplitude adjustments, pulse width variations, burst mode) are available for flexible control and to maintain a desired brightness over aging, temperature and ambient light variations. For example, dimming can be achieved by adjusting the level of the regulated current. One method varies the reference current (or the target current) to vary the amplitude of the regulated current at the output of the switching current regulator 318. Another method varies the switching duty cycle in the switching current regulator 318 to vary the average amplitude of the regulated current. Dimming can also be achieved by changing the switching duty cycle in any of the switching stages between the switching current regulator 318 and the lamp load 312. Moreover, dimming can be implemented by operating the switching current regulator 318 or any of the switching stages in burst mode and varying the burst durations. In one embodiment, a combination of dimming methods is used for an expanded dimming range.

Figure 4:
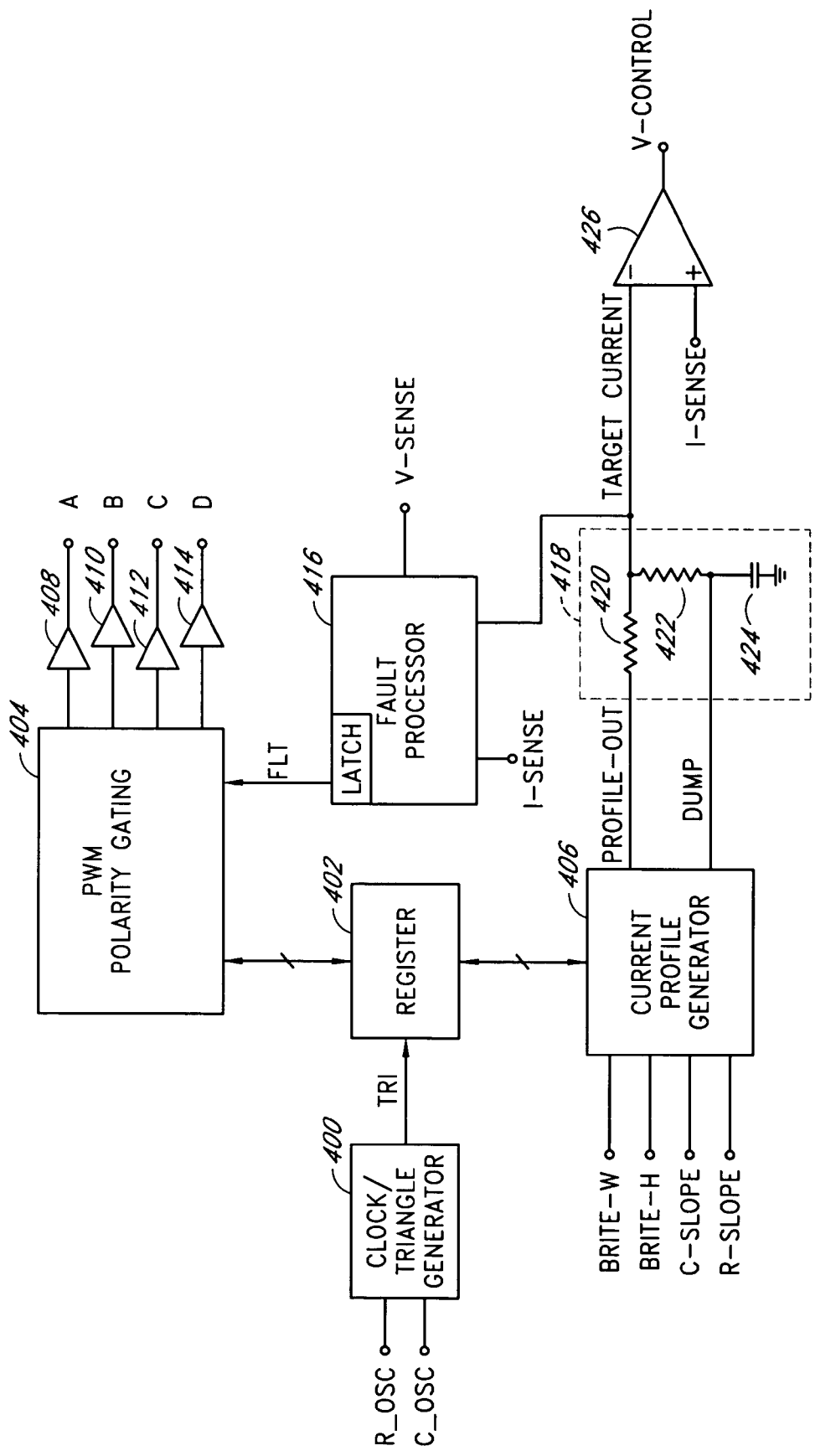
FIG. 4 is a simplified block diagram of one embodiment of a controller for a current-mode inverter.

FIG. 4 is a simplified block diagram of one embodiment of a controller for a current-mode inverter. The controller advantageously includes a current profile generator 406 to allow the current-mode inverter to synthesize flexible current waveforms (e.g., programmable lamp current amplitude and wave shaping). In one embodiment, the controller also includes a clock generator 400 and a register state machine 402. The clock generator 400 outputs a triangular timing waveform (TRI) with oscillation characteristics determined by a resistor (R_OSC) and a capacitor (C_OSC). The triangular timing waveform is provided to the register state machine 402, which outputs signals to control the operations of the current profile generator 406.

In one embodiment, the current profile generator 406 produces a profile signal (PROFILE-OUT) in a variety of programmable waveform shapes defined by at least a slope capacitor (C-SLOPE), an optional slope resistor (R-SLOPE), and two input control signals (BRITE-W, BRITE-H). For example, the slope capacitor and input control signals define a rising slope, a plateau, and a falling slope of the profile signal.

In one embodiment, the profile signal is provided to an input current regulator to generate a regulated current with the programmed waveform shape for the current-mode inverter. In one application, an optional attenuation circuit 418 conditions the profile signal for comparison with a feedback signal (I-SENSE) by a comparator circuit 426 that outputs a driving signal (V-CONTROL) to the input current regulator. For example, the optional attenuation circuit 418 includes two resistors 420, 422 configured as a voltage-divider to reduce the amplitude range of the profile signal to match the amplitude range of the feedback signal. The feedback signal may be representative of a load current, and the conditioned profile signal (TARGET CURRENT) represents the desired load current. The attenuation circuit 418 optionally includes a pre-emphasis capacitor 424 inserted between the resistor 422 and ground to pre-emphasize the profile signal. The pre-emphasis capacitor 424 is periodically discharged by an output signal (DUMP) from the current profile generator 406 and provides an upslope to the plateau sections of the profile signal to compensate for magnetization current in a transformer of the current-mode inverter.

In one embodiment, the comparator circuit 426 is a hysteretic PWM circuit that controls the input current regulator to produce a regulated current that follows the shape of the conditioned profile signal. The regulated current is coupled to a lamp load without significant distortion and in alternate sense using a non-resonant switching network and a high bandwidth, closely-coupled transformer. Thus, the current profile generator 406 advantageously allows direct control of the lamp current wave shape, thereby direct control of lamp current crest factor. The lamp current crest factor can be optimized to increase luminous efficiency of a lamp while extending the lamp's useful life.

In one embodiment, the controller further includes a polarity-switching generator (PWMIPOLARITY GATING) 404. The polarity-switching generator 404 produces driving signals (A, B, C, D) for the non-resonant switching network with reference to the triangular timing waveform. In one application, the polarity-switching generator 404 is controlled by signals from the register state machine 402. The outputs of the polarity-switching generator 404 may be provided to level-shifters or buffer circuits 408, 410, 412, 414 to provide appropriate driving levels to semiconductor switches in the non-resonant switching network.

In yet another embodiment, the controller includes a fault processor 416. The fault processor 416 monitors a variety of feedback signals to determine if a fault exists and outputs a fault signal (FLT) to the polarity-switching generator 404 to implement a shut-down sequence. For example, the fault processor 416 monitors a voltage feedback signal (V-SENSE) for occurrence of open lamp conditions after striking. The fault processor 416 also monitors the current feedback signal (I-SENSE) and the profile signal to determine possible faults in the current regulator. The fault processor 416 can monitor other signals to generate the fault signal and initiate the shut-down sequence. The shut-down sequence includes turning on the semiconductor switches in the non-resonant switching network to stop the deliver of power to the load. The shut-down sequence may also include reducing the regulated current to substantially zero.

Figure 5:
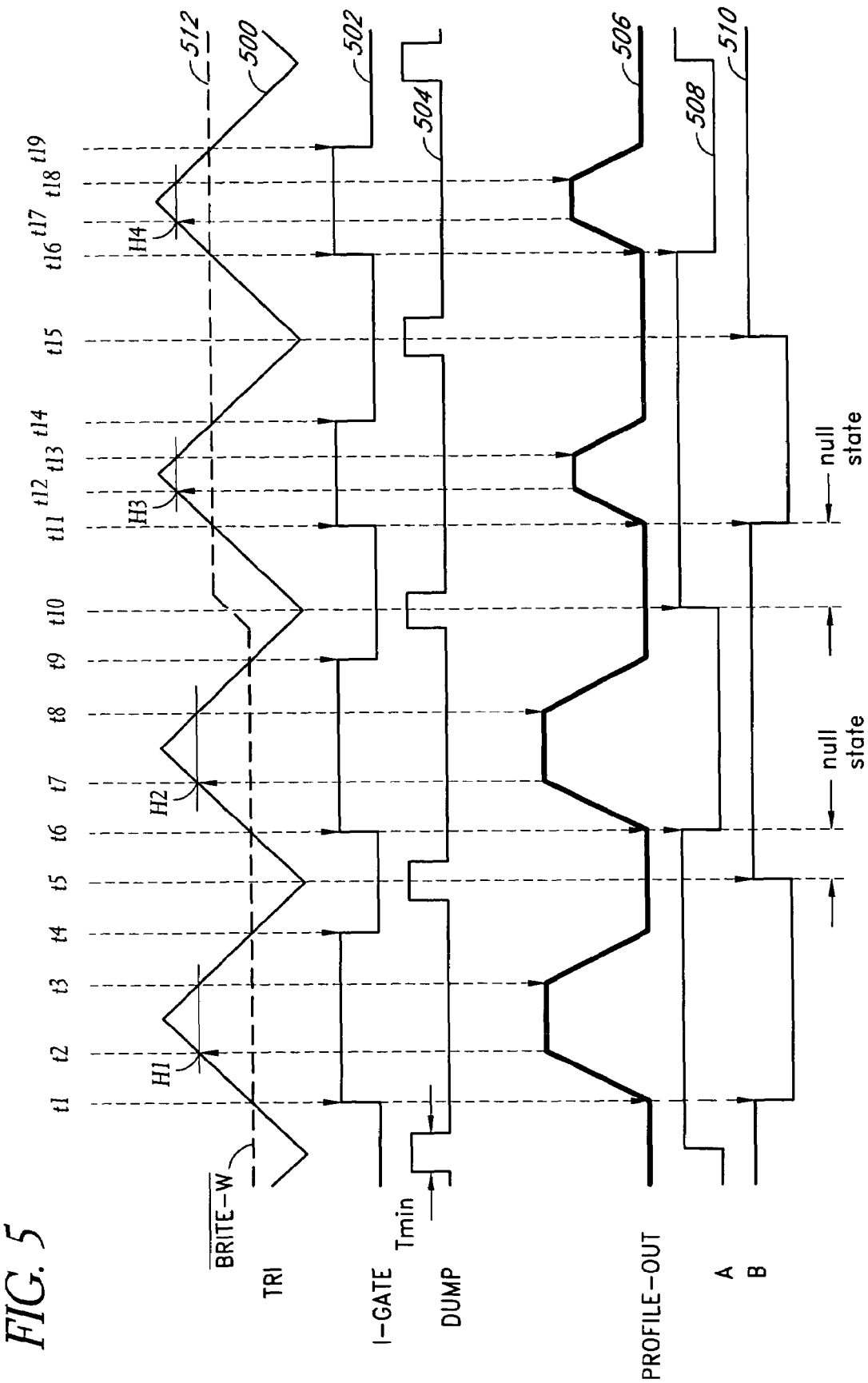
FIG. 5 illustrates timing waveforms associated with the controller of FIG. 4.

FIG. 5 illustrates timing waveforms associated with one embodiment for generating a profile signal using the current profile generator 406. A first graph 500 shows a triangular timing waveform (TRI). A second graph 502 shows a first logic waveform (I-GATE). A third graph 504 shows a second logic waveform (DUMP). As discussed above, the second logic waveform is used to periodically discharge the optional pre-emphasis capacitor 424. The third graph 504 shows that the second logic waveform is a narrow-width signal that activates for a predetermined duration (Tmin) near each negative peak of the triangular timing waveform. In an alternate embodiment, the second logic waveform substantially follows the first logic waveform, and discharges the optional pre-emphasis capacitor 424 when the first logic waveform is low.

A fourth graphs 506 shows a profile signal (PROFILE-OUT). A fifth graph 508 and a sixth graph 510 show driving signals (A, B) for a switching network. The triangular timing waveform is used a time base (or a reference waveform) for generating the profile signal and the driving signals. Two substantially identical wave shapes in the profile signal are produced for every cycle of the driving signals. In one embodiment, each cycle of the driving signals corresponds to a cycle in the load current. Each wave shape in the profile signal is symmetric about the positive peaks of the triangular timing waveform.

The wave shapes of the profile signal have multiple, user programmable, features (e.g., frequency, pulse width, pulse height, rise and fall slopes, etc.). The frequency can be set by adjusting the frequency of the triangular timing waveform, which is controlled by the oscillation resistor (R_OSC) and the oscillation capacitor (C_OSC). The pulse width can be set by a first control signal (BRITE-W). An inversion of the first control signal is shown overlaying the triangular timing waveform as graph 512. The first logic waveform has logic transitions at times when the triangular timing waveform crosses the inverted version of the first control signal and represents the pulse width of the profile signal. In one embodiment, the pulse width is limited to be no greater than 95% of the period. The pulse height can be set by a second control signals (BRITE-H). In one embodiment, the pulse height is limited to range from near zero to about ⅔ of the amplitude of the triangular timing waveform (e.g., approximately zero to 2.5 volts). The rise and fall slopes can be set by the slope capacitor (C-SLOPE) and optionally the slope resistor (R-SLOPE).

Referring to the graph 506 of FIG. 5, the profile signal is synthesized from three straight lines comprising a leading edge, a plateau, and a falling edge. The leading edge begins when the rising portion of the triangular timing waveform crosses the inverted version of the first control signal (e.g., at time t1). At this time, a positive slope current source charges the slope capacitor with a predetermined current or a current set by the optional slope resistor. When the voltage across the slope capacitor reaches the level of the second control signal (e.g., at time t2), the positive slope current source is turned off and the plateau begins. The level (H1) of the triangular timing waveform at time t2 is noted. When the falling portion of the triangular timing waveform crosses the noted level (e.g., at time t3), the falling edge begins to produce a symmetrical wave shape with respect to the positive peak of the triangular timing waveform.

In one embodiment in which the profile signal controls a regulated current for powering a lamp, the first control signal and the second control signal can be independently adjusted to vary the brightness of the lamp. For example, the pulse width of the profile signal increases with increasing level of the first control signal, and the amplitude of the profile signal increases with increasing level of the second control signal. The graph 506 shows two relatively bigger pulses generated with the first control signal and the second control signal at one level followed by two relatively smaller pulses generated with the first control signal and the second control signal at lower levels.

As discussed above, every two substantially identical cycles of the profile signal corresponds to one cycle of AC current through the lamp. Polarity reversing for every other cycle is accomplished in a polarity-switching network. The graphs 508, 510 show driving signals (A, B) to semiconductor switches in one embodiment of the polarity-switching network. The driving signals are alternately active and change states with overlapping "on" times between each cycle of the profile signal. For example, the first driving signal is active (high) while the second driving signal is inactive (or low) during the first cycle from time t1 to time t4. The driving signals then change states before the next cycle. The inactive driving signal changes before the active driving signal to provide a null state between cycles with both driving signals active. In one embodiment, the inactive driving signal changes to an active driving state at about the negative peak of the triangular timing waveform (e.g., at time t5). The active driving state changes to an inactive driving state at about the start of the leading edge of the profile signal (e.g., at time t6).

Figure 6:
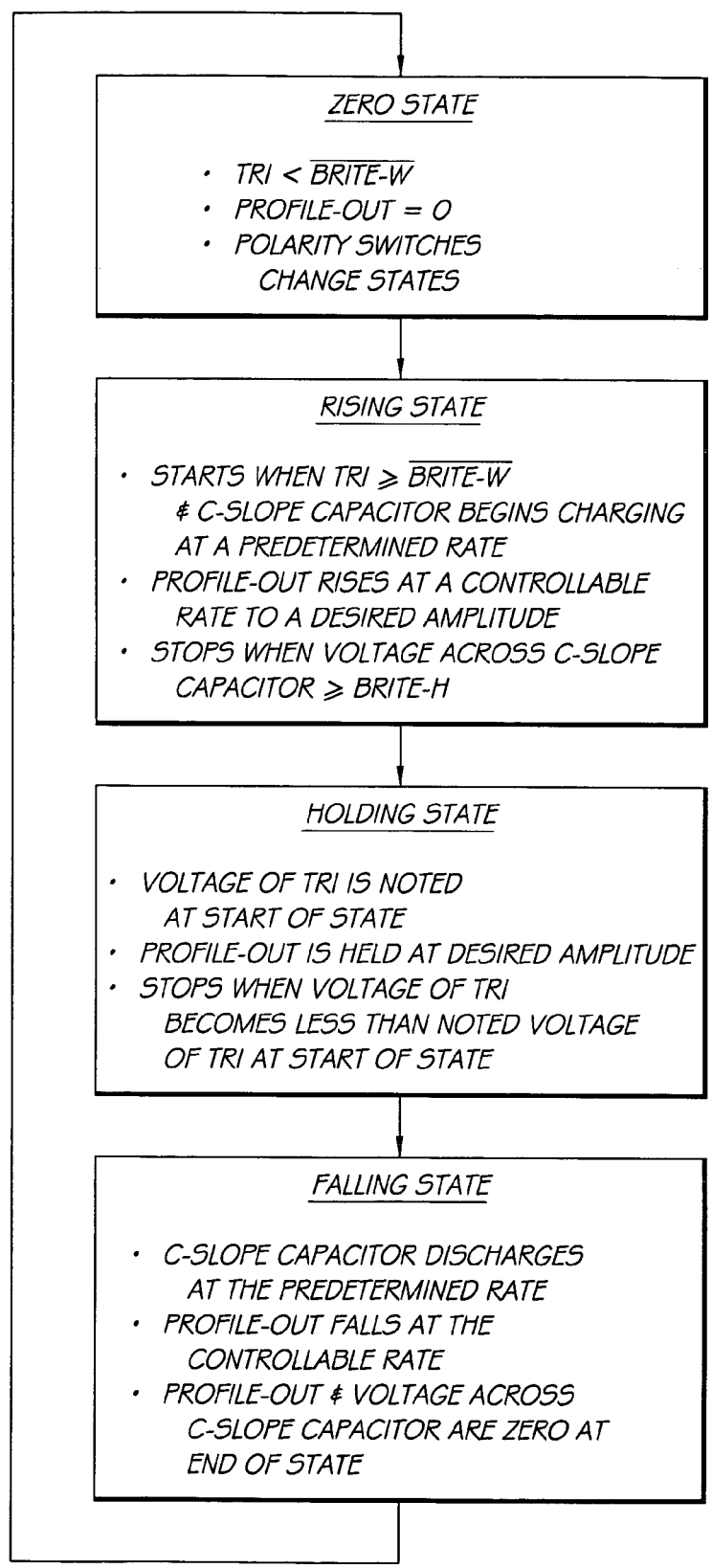
FIG. 6 is one embodiment of a flow chart to illustrate steps in generating a current profile signal by the controller of FIG. 4.

FIG. 6 is a flow chart to illustrate the various states that one embodiment of the register state machine 402 cycles through to generate the profile signal. For example, the register state machine 402 repeatedly and sequentially goes through a zero state, a rising state, a holding state and a falling state. The zero state corresponds to a zero output of the profile signal, which occurs when the triangular timing waveform is less than the inverted first control signal. The driving signals for the polarity-switching network are configured to change during the zero state.

The rising state corresponds to a rising edge of the profile signal. The rising state starts when a rising portion of the triangular timing waveform crosses the level of the inverted first control signal. The profile signal rises at a controllable rate and the slope capacitor charges at a predetermined rate during the rising state. The profile signal stops rising and the slope capacitor stops charging when the voltage across the slope capacitor reaches a level defined by the second control signal.

The holding state begins when the slope capacitor stops charging. The holding state corresponds to a plateau of the profile signal in which the profile signal is held substantially constant. The level of the still rising triangular timing waveform is noted at the beginning of the holding state. When the triangular timing waveform crosses the noted level during a falling portion of the triangular timing waveform, the holding state stops.

The falling state follows the holding state. The falling sate corresponds to the falling edge of the profile signal. The slope capacitor discharges while the level of the profile signal falls. The slope capacitor returns to its initial value and the profile signal is approximately zero at about the time the triangular timing waveform becomes less than the inverter first control signal. The next zero state begins.

The profile signal can advantageously can be used to generate a lamp current with an arbitrary wave shape (e.g., a sine wave, a square wave, a trapezoidal wave, etc.), independent of lamp characteristics, to optimize luminous efficiency or to reduce EMI. In one embodiment, a square wave lamp current is applied to a lamp, resulting in a lamp current crest factor that approaches unity and improves luminous efficiency in comparison to a sine wave lamp current which has a lamp current crest factor of approximately 1.4. The low crest factor from the square wave lamp current and high efficiency of a closely-coupled transformer in the current-mode inverter can provide more nits/watt than traditional sine wave lamp currents. Correspondingly, fewer lamps in multi-lamp LCD backlight assemblies may be used to achieve about the same brightness. Programmable lamp current waveforms can also enable low EMI solutions. In one embodiment, a trapezoidal current waveform with relatively slow rise and fall times drives the lamp, resulting in relatively low lamp current crest factor (e.g., 1.1–1.3).

A square waveform is defined by steep leading and falling edges (or relatively fast rise and fall times of less than one microsecond for the profile signal or less than two microseconds for the lamp current). A trapezoidal waveform is defined by relatively slower rise and fall times (e.g., more than one microsecond for the profile signal and more than two microseconds for the lamp current). A triangular waveform is defined by substantially no plateau.

Since the current-mode inverter operates in non-resonance, sine waveforms also need to be synthesized. In prior art synthesizers, a sine waveform is typically converted from a triangular waveform using a complicated array of diodes and resistors to form a piecewise approximation. Because of the diodes, the conversion circuitry is quite temperature sensitive.

Figure 7:
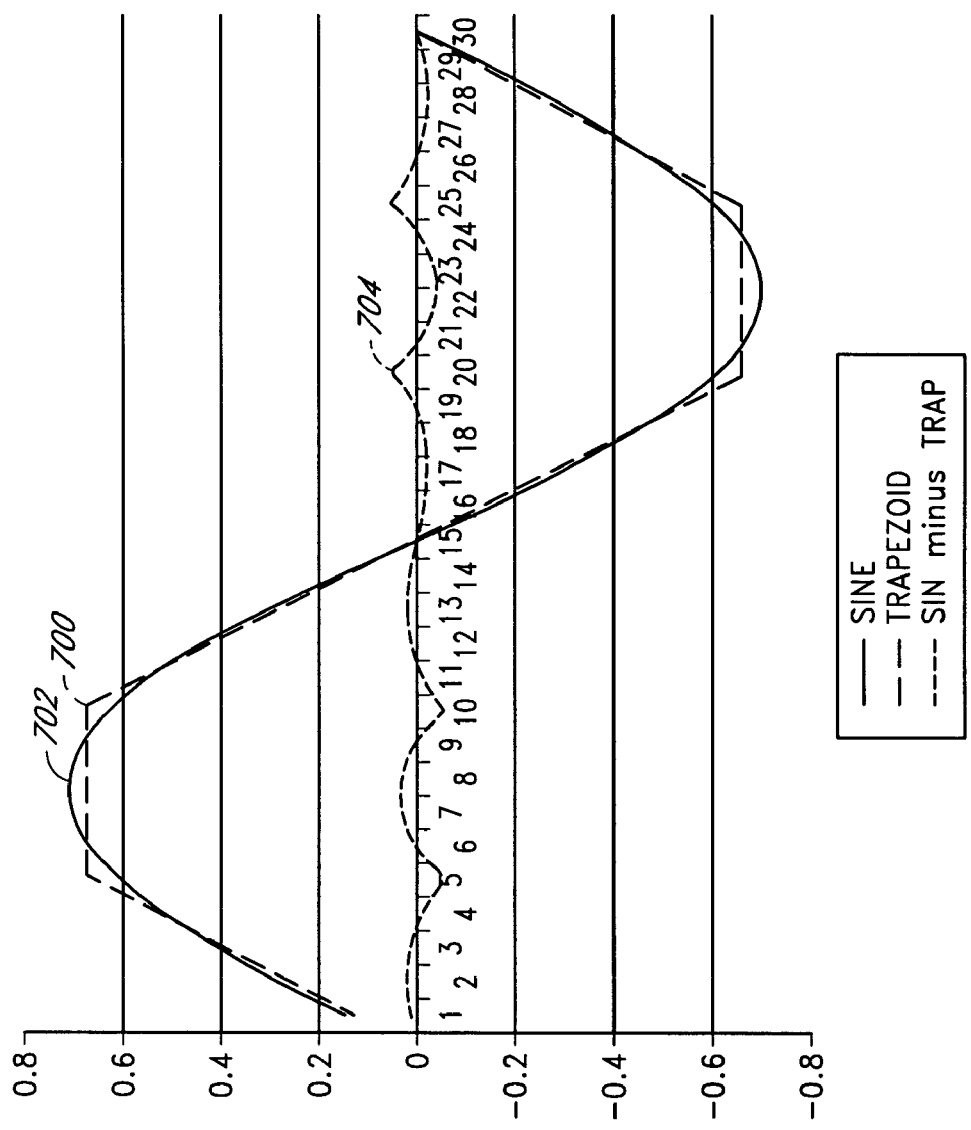
FIG. 7 illustrates a proposed trapezoidal waveform that contains no harmonics lower than the fifth harmonic, so that it can readily be filtered to have a relatively low Total Harmonic Distortion (THD).

FIG. 7 illustrates a novel method to generate a sine waveform from a trapezoidal waveform. For example, a sine waveform can be approximated using a predefined trapezoidal waveform synthesized by the current profile generator 406. The trapezoidal waveform has a maximum allowable pulse width, a pulse height that is approximately ⅔ of the peak voltage of the triangular timing waveform, and substantially the same rise and fall slopes as the triangular timing waveform.

A graph 700 illustrates the proposed trapezoidal waveform, which is approximately the triangular timing waveform clipped at about ⅔ of its peak height. By inverting and repeating this shape, the resulting trapezoidal waveform contains no third harmonics of the fundamental sine wave half-cycle. Thus, a full cycle of a trapezoidal AC waveform containing no harmonics lower than a fifth harmonic is formed. The trapezoidal AC waveform can be filtered by small reactive components or by small reactances of other components to produce a sinusoidal AC waveform, shown as graph 702, with reduced harmonics or an acceptable level of THD. A graph 704 shows the difference between the trapezoidal AC waveform and the resulting sinusoidal AC waveform.

Figure 8:
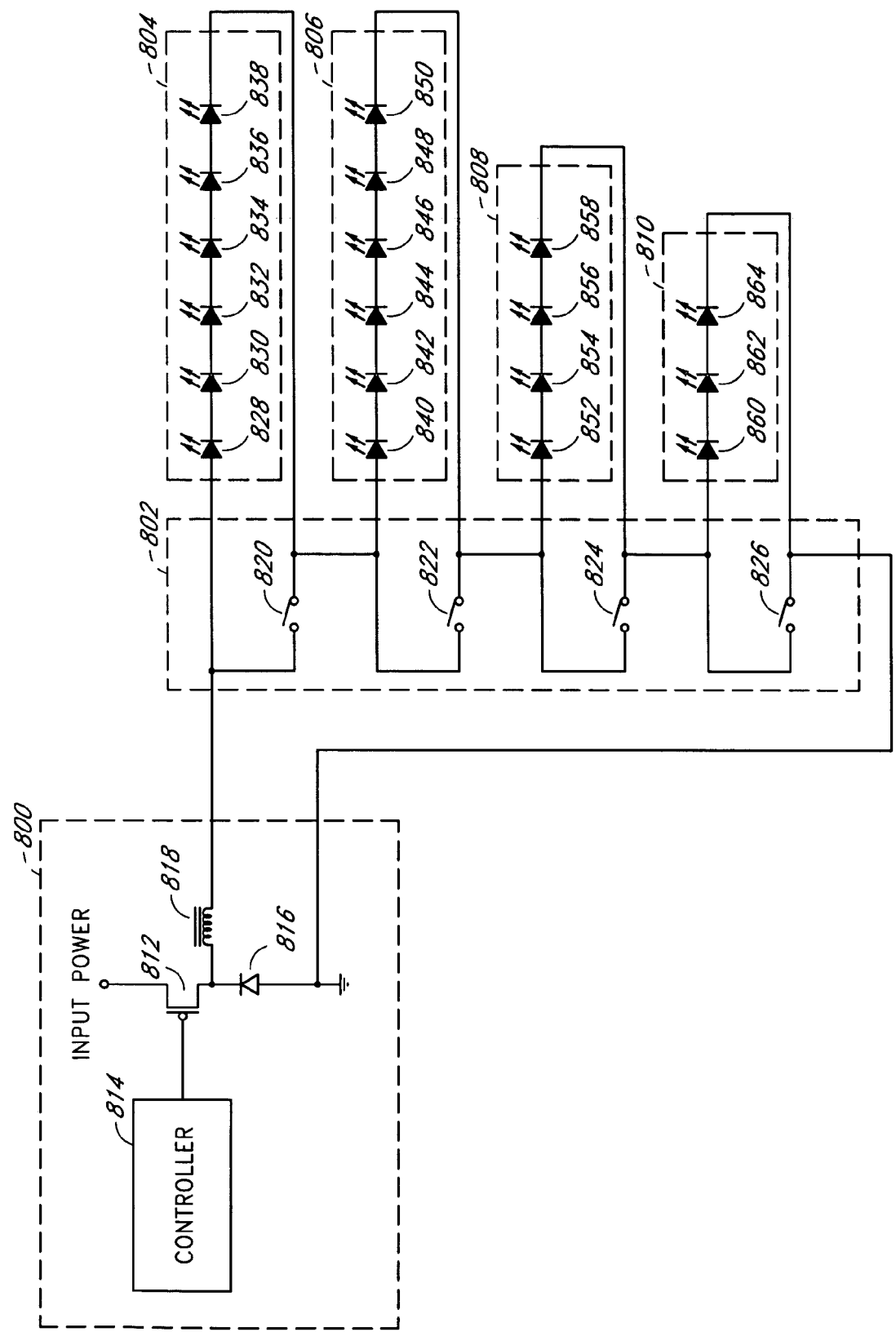
FIG. 8 is a simplified schematic of one embodiment of a current-mode driver that drives multiple loads using a time sharing technique.

FIG. 8 is a simplified schematic of one embodiment of a current-mode driver that drives multiple loads using a time-sharing technique. The current-mode driver includes an input current regulator 800 and a time-sharing switching network 802. The input current regulator 800 shown in FIG. 8 is substantially similar to the current regulators shown in previous figures with a current switch (e.g., P-FET) 812, a series inductor 818 and a catch diode 816. A controller 814 controls the current switch 812 to generate a regulated current for the time-sharing switching network 802. Other current regulator configurations that offer flexible compliance output voltages to accommodate changing loads may also be used.

In one embodiment, the time-sharing switching network 802 includes a string of semiconductor switches 820, 822, 824, 826 coupled in series across an output of the input current regulator 800. Although the embodiment of FIG. 8 shows four semiconductor switches, more or less semiconductor switches can be coupled to the input current regulator 800. The semiconductor switches 820, 822, 824, 826 are logically controlled to deliver power of substantially the same polarity to different loads (e.g., light sources in a backlight system) 804, 806, 808, 810 coupled across the respective semiconductor switches 820, 822, 824, 826. For example, each of the semiconductor switches 820, 822, 824, 826 can close to isolate (or bypass) its associated load or open to allow the associated load to conduct the regulated current. The semiconductor switches 820, 822, 824, 826 can have overlapping or under-lapping "on" times. In one embodiment, the semiconductor switches 820, 822, 824, 826 operate in a make-before-break action with overlapping switch closures. No power is provided to any of the loads when all of the semiconductor switches are shorted (or closed).

In one embodiment, the current-mode driver is used to power an array of LEDs in a backlight system. The semiconductor switches 820, 822, 824, 826 selectively provide the regulated current to different portions of the array. For example, each of the loads 804, 806, 808, 810 across the respective semiconductor switches 820, 822, 824, 826 includes a plurality of LEDs connected in series to form a horizontal row in the array. As shown in FIG. 8, each of the rows can have the same or a different number of LEDs. One horizontal row of LEDs is shorted at a time by closing the associated semiconductor switch in the time-sharing switching network 802. In one embodiment, the closures proceed in sequence (e.g., from top to bottom) in synchronism with a vertical sweep of a LCD screen. The sequential blanking minimizes backlight for the portion of the screen that is in the process of changing, thereby decreasing motion artifact in the LCD.

In one embodiment, the regulated current is greater than the rated current of the LEDs. The semiconductor switches 820, 822, 824, 826 can be controlled by a PWM circuit to increase "on" duty cycles of the semiconductor switches 820, 822, 824, 826 to compensate for the increased regulated current. The regulated current is not provided to the load when the associated semiconductor switch is "on." For example, the LEDs can be run at 1.33 times their rated current for ¾ of the time without exceeding average rated power.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A controller for a current-mode inverter comprising:
   a clock generator configured to output a periodic timing waveform;
   a current profile generator configured to produce a profile signal in a programmable waveform shape defined by at least a capacitor and two input control signals, wherein the profile signal is provided to a current regulator to generate a regulated current with the programmed waveform shape; and
   a register state machine configured to control the operations of the current profile generator with reference to the periodic timing waveform.

2. The controller of claim 1, wherein the frequency of the periodic timing waveform is determined by a resistor and a capacitor.

3. The controller of claim 1, further comprising an attenuation circuit coupled between an output of the current profile generator and an input of the current regulator to reduce the amplitude range of the profile signal for comparison with a feedback signal.

4. The controller of claim 1, further comprising a hysteretic pulse width modulation circuit configured to generate a control signal to the current regulator based on a comparison of the profile signal to a feedback signal representative of a load current.

5. The controller of claim 1, wherein the regulated current is coupled to a fluorescent lamp using a non-resonant inverter, and the two input control signals to the current profile generator are independently adjustable to vary the brightness of the fluorescent lamp.

6. The controller of claim 5, further comprising a pulse width modulation circuit configured to generate polarity switching signals for semiconductor switches in the non-resonant inverter with reference to the periodic timing waveform.

7. The controller of claim 6, further comprising a fault processor configured to output a fault signal to shut down the pulse width modulation circuit upon detecting faulty conditions in the fluorescent lamp or in the non-resonant inverter, wherein the pulse width modulation circuit configures the polarity switching signals keep the semiconductor switches on continuously in response to the fault signal.

8. The controller of claim 1, wherein the register state machine cycles through four states corresponding to zero, rising edges, plateaus, and falling edges of the profile signal.

9. A method to generate a current profile for a current regulator in a current-mode inverter, the method comprising the acts of:
   periodically setting the current profile to a reference level, wherein the period is determined by a periodic triangular waveform;
   comparing a first control input signal to the periodic triangular waveform to determine an active duration of the current profile in each period, wherein the current profile increases at a programmable rising rate and a capacitor starts charging at about the beginning of the active duration;
   holding the current profile at a substantially constant level when the voltage across the capacitor is about equal to or above a predefined holding threshold, wherein the voltage of the periodic triangular waveform is noted at about the time the voltage across the capacitor crosses the predefined holding threshold and the capacitor stops charging;

reducing the level of the current profile at a programmable falling rate and discharging the capacitor when the voltage of the periodic triangular waveform is approximately less than the noted voltage, wherein the current profile returns to the reference level by the end of the active duration.

10. The method of claim 9, wherein the reference level is zero.

11. The method of claim 9, wherein the current-mode inverter drives at least one fluorescent lamp and two substantially identical cycles of the current profile are generated for every cycle of current flowing through the fluorescent lamp.

12. The method of claim 9, wherein the current profile pulse-width is determined by the first control input signal, and the current profile amplitude is determined by the predefined holding threshold.

13. The method of claim 9, wherein the current profile is a periodic square waveform with rise and fall times of less than one microsecond.

14. The method of claim 9, wherein the current profile is a periodic trapezoidal waveform with rise and fall times that are greater than one microsecond.

15. The method of claim 9, wherein the current profile is a periodic trapezoidal waveform that is substantially identical to the periodic triangular waveform with its amplitude clipped at substantially ⅔ of the peak amplitude of the periodic triangular waveform.

16. The method of claim 15, further comprising filtering the current profile to generate a sinusoidal waveform.

17. A controller for a current-mode inverter comprising:

means for generating a periodic timing signal;

means for defining a rising slope, a plateau, and a falling slope of a current profile signal with a capacitor and two input control signals, wherein the current profile signal determines the wave shape of a regulated current source; and means for generating a pair of substantially identical wave shapes for every two cycles of the periodic timing signal.

18. The inverter with a current-mode controller of claim 17, further comprising a switching network that operates synchronously with the periodic timing signal to periodically alternate conduction paths for the regulated current source to produce an AC driving current.

19. The inverter with a current-mode controller of claim 17, further comprising means for adding pre-emphasis to the current profile signal by providing an upslope to the plateau to compensate for magnetizing current in a transformer of the inverter.

20. The inverter with current-mode controller of claim 17, further comprising means for adjusting amplitude range of the current profile signal to match amplitude range of a feedback signal.

* * * * *